United States Patent
Seki et al.

(10) Patent No.: US 9,014,464 B2
(45) Date of Patent: Apr. 21, 2015

(54) MEASUREMENT DEVICE, MEASUREMENT METHOD, AND COMPUTER PROGRAM PRODUCT

(71) Applicants: Akihito Seki, Kanagawa (JP); Ryuzo Okada, Kanagawa (JP)

(72) Inventors: Akihito Seki, Kanagawa (JP); Ryuzo Okada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 180 days.

(21) Appl. No.: 13/731,948

(22) Filed: Dec. 31, 2012

(65) Prior Publication Data
US 2013/0188860 A1  Jul. 25, 2013

(30) Foreign Application Priority Data
Jan. 19, 2012  (JP) .................. 2012-009255

(51) Int. Cl.
*G06K 9/00*  (2006.01)
*G01B 11/14*  (2006.01)
*G01B 11/00*  (2006.01)

(52) U.S. Cl.
CPC .............. *G01B 11/14* (2013.01); *G01B 11/002* (2013.01)

(58) Field of Classification Search
USPC ........................................................ 382/154
See application file for complete search history.

(56) References Cited

U.S. PATENT DOCUMENTS

| | | | |
|---|---|---|---|
| 7,010,157 B2* | 3/2006 | Kochi et al. | 382/154 |
| 7,193,626 B2* | 3/2007 | Otani et al. | 345/418 |
| 7,747,150 B2* | 6/2010 | Anai et al. | 396/55 |
| 7,747,151 B2* | 6/2010 | Kochi et al. | 396/55 |
| 7,860,273 B2* | 12/2010 | Kochi et al. | 382/103 |
| 7,860,276 B2* | 12/2010 | Anai et al. | 382/107 |
| 8,811,718 B2* | 8/2014 | Anai et al. | 382/154 |
| 2001/0045979 A1* | 11/2001 | Matsumoto et al. | 348/43 |
| 2007/0263924 A1* | 11/2007 | Kochi et al. | 382/154 |

FOREIGN PATENT DOCUMENTS

JP     2007-278845     10/2007

OTHER PUBLICATIONS

Andrea Fusiello, Emanuele Trucco, and Alessandro Verri. 2000. A compact algorithm for rectification of stereo pairs. Mach. Vision Appl. 12, 1 (Jul. 2000), 16-22.*

(Continued)

*Primary Examiner* — Utpal Shah
(74) *Attorney, Agent, or Firm* — Nixon & Vanderhye, P.C.

(57) ABSTRACT

According to an embodiment, a second calculator calculates a three-dimensional position of a measurement position and error in the three-dimensional position using a first image, the measurement position, a second image, and a correspondence position. A selection unit determines whether there is an image pair, in which error in the three-dimensional position becomes smaller than the error calculated by the second calculator, from among image pairs of the plurality of images, when there is an image pair, selects the image pair, and when there is no image pair, decides on the three-dimensional position. Each time an image pair is selected, the second calculator calculates a new three-dimensional position of the measurement position and error using new first and second images each included in the image pair, and first and second projection positions where the three-dimensional positions are projected onto the new first and second images, respectively.

10 Claims, 10 Drawing Sheets

(56) References Cited

OTHER PUBLICATIONS

Brown, M.Z.; Burschka, D.; Hager, G.D., "Advances in computational stereo," Pattern Analysis and Machine Intelligence, IEEE Transactions on, vol. 25, No. 8, pp. 993,1008, Aug. 2003.*

Office Action mailed Aug. 26, 2014 in counterpart Japanese Patent Application No. 2012-009255 and English-language translation thereof.
Office Action mailed Sep. 22, 2014 in counterpart Chinese Patent Application No. 201310019942 and English-language translation thereof.

* cited by examiner

MEASUREMENT DEVICE, MEASUREMENT METHOD, AND COMPUTER PROGRAM PRODUCT

CROSS-REFERENCE TO RELATED APPLICATION(S)

This application is based upon and claims the benefit of priority from Japanese Patent Application No. 2012-009255, filed on Jan. 19, 2012; the entire contents of which are incorporated herein by reference.

FIELD

Embodiments described herein relate generally to a measurement device, a measurement method, and a computer program product.

BACKGROUND

A technique, called stereo measurement, in which the three-dimensional position of an object is measured from the correspondence relation between a plurality of images captured by a plurality of cameras with different viewpoints has been heretofore known.

For example, the three-dimensional position is measured as the following manner. A pair of images is selected from a plurality of images, and the three-dimensional position is measured from the positional relation between the positions of measurement points on selected images and the positions of cameras captured the selected images. However, measurement accuracy differs depending on the position of the camera, the focal length of the lens, the size of the imaging element, resolution, and the position of the measurement point on the image. For this reason, in order to increase the measurement accuracy of the three-dimensional position, it is necessary to select an optimum pair of images in the relation with the measurement points.

However, according to the conventional technique, since optimum images are selected in the relation with a specific image from among a plurality of images, it is not possible to select an image pair not including the specific image. For this reason, it is not possible to select an optimum image pair in the relation with the measurement point, causing deterioration in the measurement accuracy of the three-dimensional position.

DETAILED DESCRIPTION

According to an embodiment, a measurement device includes a display controller configured to display a first image from among a plurality of images captured from different viewpoints on a display unit; a setting unit configured to set a measurement position on the first image; a first calculator configured to calculate a correspondence position, which corresponds to the measurement position, on a second image other than the first image from among the plurality of images; a second calculator configured to calculate a three-dimensional position of the measurement position and an error in the three-dimensional position using the first image, the measurement position, the second image, and the correspondence position; and a selection unit configured to determine, each time the three-dimensional position and the error are calculated by the second calculation unit, whether or not there is an image pair, in which an error in the three-dimensional position becomes smaller than the error calculated by the second calculator, from among image pairs of the plurality of images, and further configured to, when there is the image pair, select the image pair, but when there is no image pair, decide on the three-dimensional position. Each time the image pair is selected by the selection unit, the second calculator calculates a new three-dimensional position of the measurement position and an error using a new first image included in the image pair, a first projection position where the three-dimensional position is projected onto the new first image, a new second image included in the image pair, and a second projection position where the three-dimensional position is projected onto the new second image.

Hereinafter, an embodiment will be described in detail with reference to the accompanying drawings.

Figure 1:
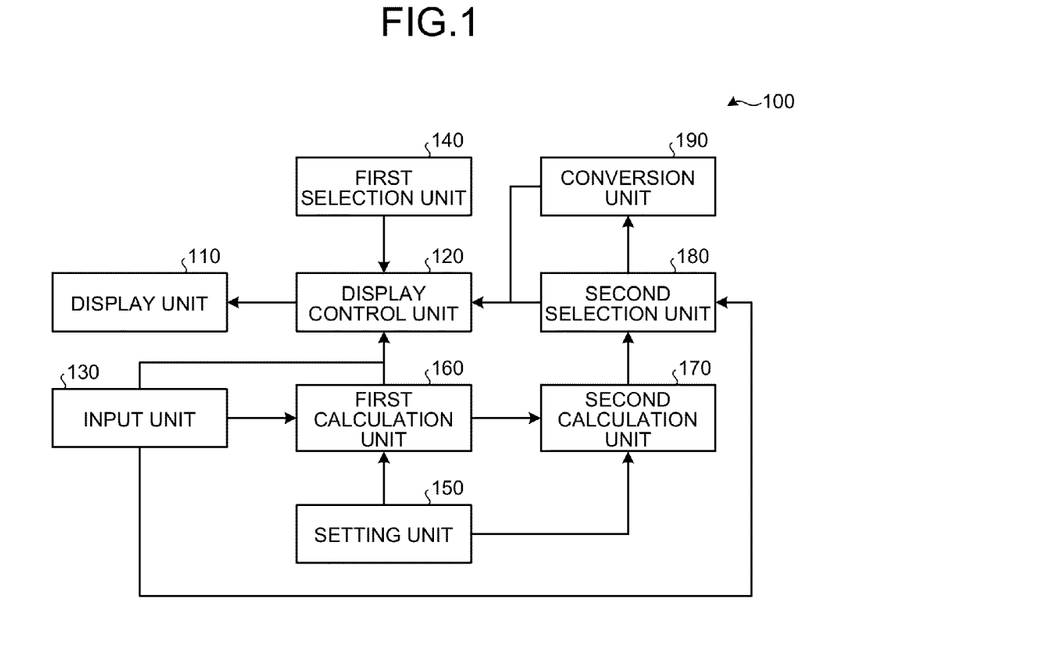
FIG. 1 is a configuration diagram illustrating an example of a measurement device of this embodiment.

FIG. 1 is a configuration diagram illustrating an example of a measurement device 100 of this embodiment. As illustrated in FIG. 1, a measurement device 100 includes a display unit 110, a display control unit 120, an input unit 130, a first selection unit 140, a setting unit 150, a first calculation unit 160, a second calculation unit 170, a second selection unit 180, and a conversion unit 190.

The display unit 110 can be implemented by a display device, for example, a liquid crystal display or the like. The display control unit 120, the first selection unit 140, the setting unit 150, the first calculation unit 160, the second calculation unit 170, the second selection unit 180, and the conversion unit 190 may be implemented by a program which is executed on a processing device, such as a CPU (Central Processing Unit), that is, software, may be implemented by hardware, such as an IC (Integrated Circuit), or may be implemented by a combination of software and hardware. The input unit 130 can be implemented by, for example, an imaging device, such as a camera, a storage device which stores therein an image captured by the imaging device, and the like. The storage device can be implemented by, for example, at least one of magnetically, optically, and electrically storable storage devices, such as an HDD (Hard Disk Drive), an SSD (Solid State Drive), a ROM (Read Only Memory), and a memory card.

Figure 2:
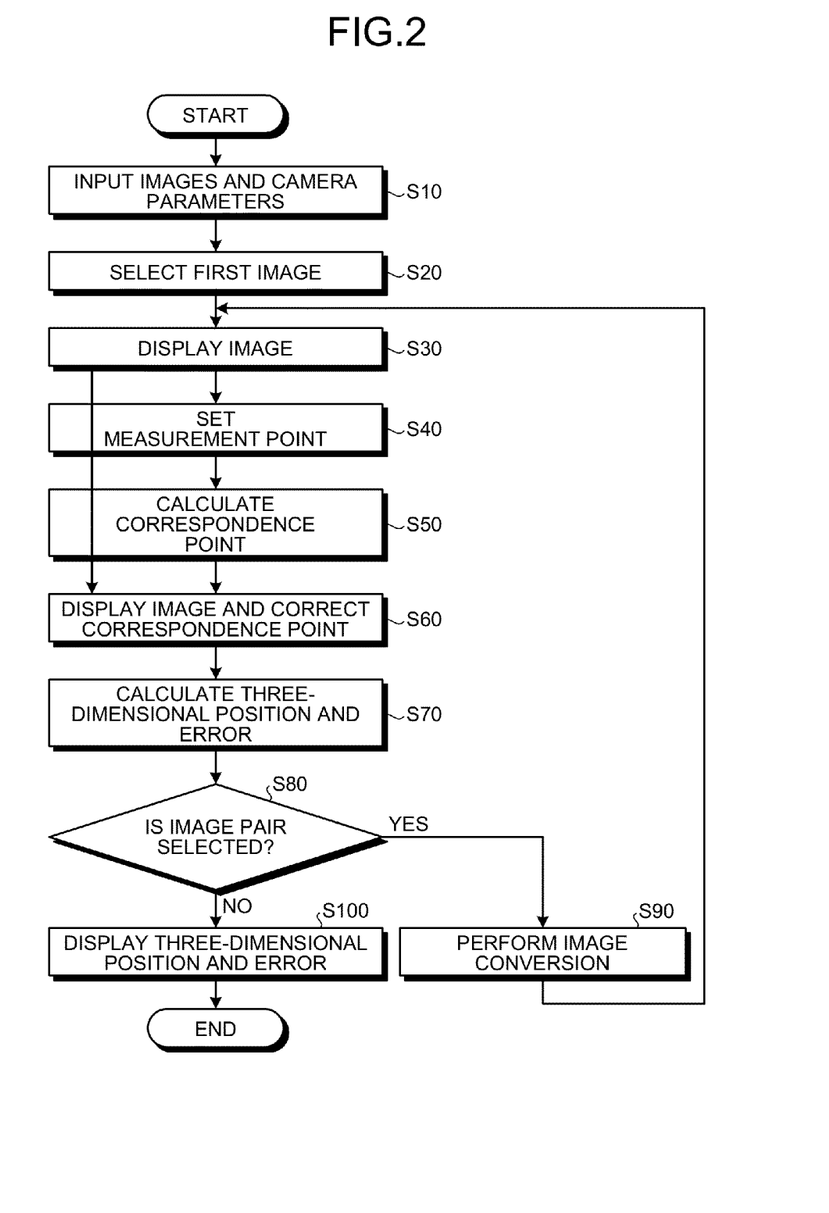
FIG. 2 is a flowchart illustrating a measurement process example of this embodiment.

FIG. 2 is a flowchart illustrating an example of the flow of a procedure of measurement process which is performed by the measurement device 100 of the embodiment.

First, the input unit 130 receives a plurality of images captured from different viewpoints and the camera parameters of the camera when capturing the plurality of images according to a mouse operation or the like from an operator (Step S10).

The camera parameters are classified roughly into the internal parameters of the camera and the external parameters. The internal parameters include the optical center coordinates of the lens on an image, the focal length of the lens, and the effective pixel interval of the imaging element. The external parameters represent movement of the camera, and are expressed by a rotation matrix, a translation vector, and the like. The camera parameters may be a projection matrix (synonymous with a perspective projection matrix) in which the internal parameters and the external parameters are combined. The projection matrix is a matrix of three rows and four columns, and represents transformation from the three-dimensional coordinates (an example of a three-dimensional coordinate system) on a space to the image coordinates (an example of an image coordinate system) of each camera.

It is assumed that an image to be input is suitable for measuring the three-dimensional position while distortion or the like is removed in advance.

Figure 3:
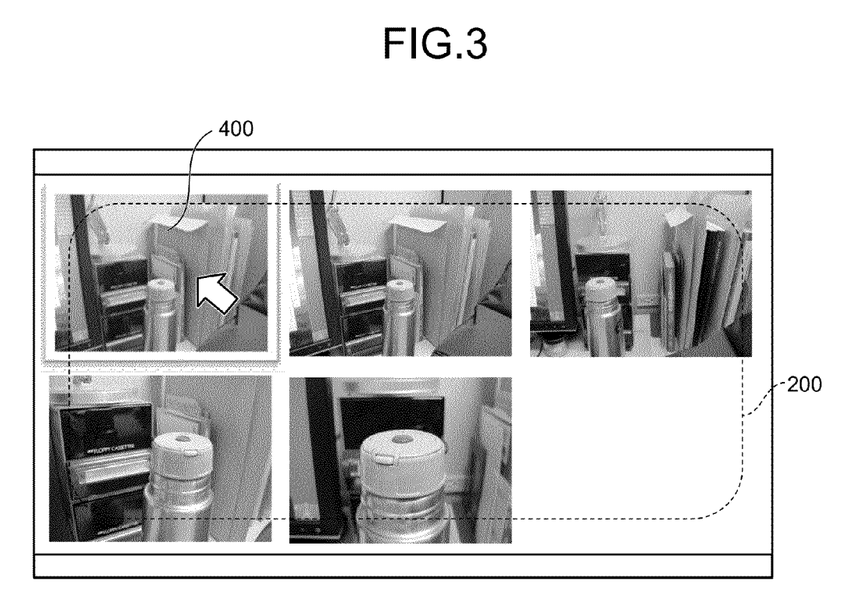
FIG. 3 is a diagram illustrating a selection screen example of this embodiment.

If a plurality of images are input through the input unit 130, the display control unit 120 displays a selection screen of the plurality of images on the display unit 110, and the first selection unit 140 selects a first image from among the plurality of images according to a mouse operation or the like from the operator (Step S20). FIG. 3 is a diagram illustrating an example of a selection screen of this embodiment. In the example illustrated in FIG. 3, the first selection unit 140 selects an image 400 from among a plurality of images 200 as the first image.

Figure 4:
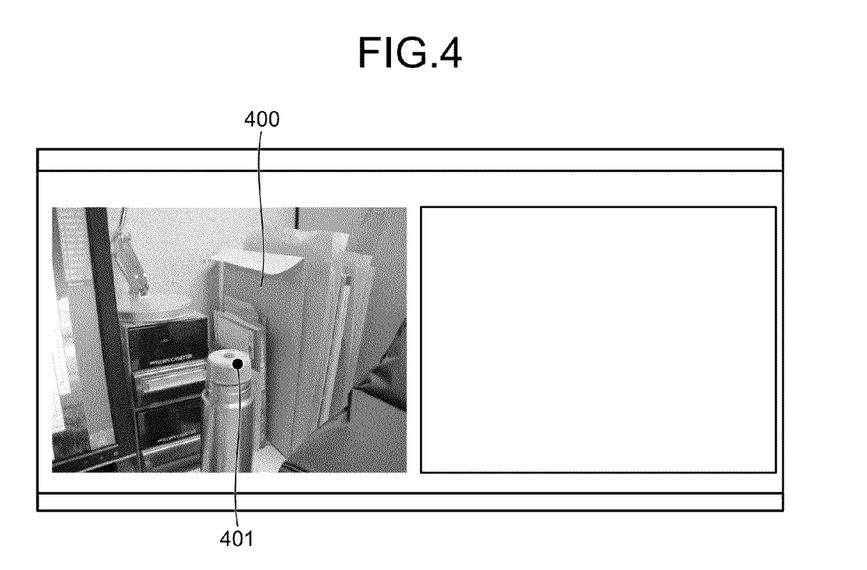
FIG. 4 is a diagram illustrating a display screen example of this embodiment.

If the first image is selected by the first selection unit 140, the display control unit 120 displays a display screen of the first image on the display unit 110 (Step S30). FIG. 4 is a diagram illustrating an example of a display screen of this embodiment. In the example illustrated in FIG. 4, the display control unit 120 displays a display screen of the image 400 selected as the first image by the first selection unit 140 on the display unit 110.

When the process returns from Step S90 to this step, the display control unit 120 displays the first image subjected to the image conversion in Step S90 and the display screen of the second image selected in Step S80 on the display unit 110.

Subsequently, the setting unit 150 sets a measurement point (an example of a measurement position) on the first image in the display screen displayed on the display unit 110 according to a mouse operation or the like from the operator (Step S40). The measurement point is the measurement-target point of the three-dimensional position. In Step S30, if an image in which the measurement point and the surroundings of the measurement point are sufficiently shown is selected as the first image, it becomes easy for the operator to input the measurement point. In the example illustrated in FIG. 4, the setting unit 150 sets a measurement point 401 on the image 400 on the display screen.

Meanwhile, when passing through Step S90, since the measurement point (projection point) is already set on the first image, this step may not be provided. When the measurement point which is already set is shifted from the measurement-target position, the setting unit 150 may correct and reset the position of the measurement point.

If the measurement point is set by the setting unit 150, the first calculation unit 160 calculates a correspondence point (an example of a correspondence position), which corresponds to the measurement point set on the first image, on a second image which is any image other than the first image from among the plurality of images input from the input unit 130 (Step S50).

Meanwhile, when passing through Step S90, since the correspondence point (projection point) on the second image is already calculated, this step may not be provided. However, in Step S40, when the measurement point is reset, the first calculation unit 160 executes this step.

Figure 5:
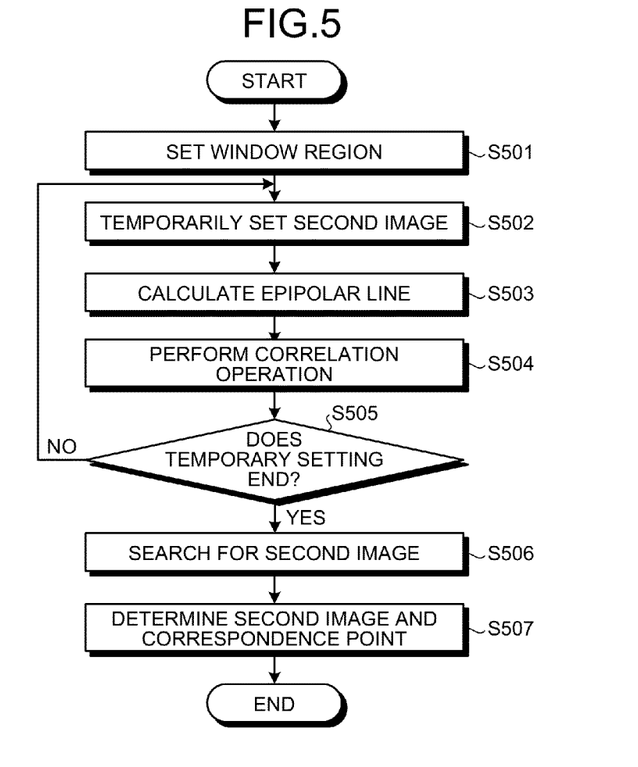
FIG. 5 is a flowchart illustrating a correspondence point calculation process example of this embodiment.

FIG. 5 is a flowchart illustrating an example of the flow of a procedure of correspondence point calculation process which is performed by the first calculation unit 160 of this embodiment.

Figure 6:
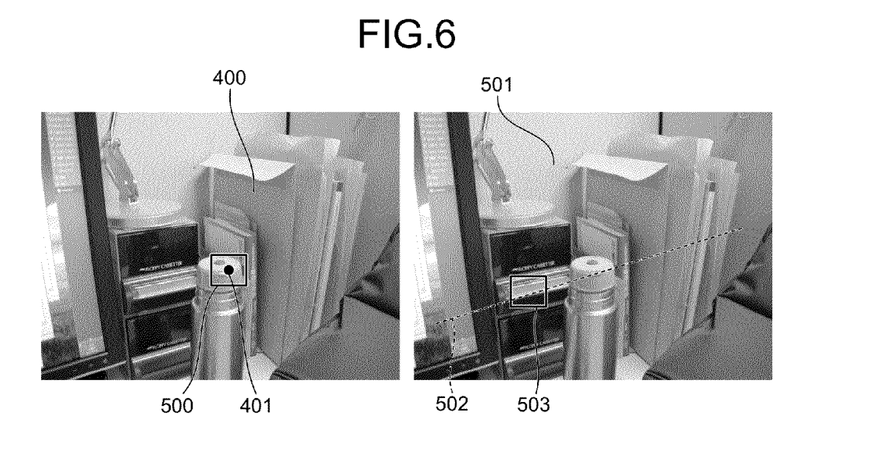
FIG. 6 is an explanatory view of a correspondence point calculation process example of this embodiment.

First, the first calculation unit 160 sets a window region, which surrounds the measurement point, on the first image (Step S501). The first calculation unit 160 may determine the size of the window region depending on the resolution and size of the first image, the presence/absence of texture, and the like. FIG. 6 is an explanatory view of an example of correspondence point calculation process of this embodiment. In the example illustrated in FIG. 6, a window region 500 surrounding the measurement point 401 is set on the image 400 as the first image.

Subsequently, the first calculation unit 160 temporarily sets a second image (Step S502). The first calculation unit 160 may temporarily set all images other than the first image from among a plurality of images input from the input unit 130 as the second image, or may temporarily set a specific image other than the first image from among a plurality of images input from the input unit 130 as the second image.

Although in this embodiment, the first calculation unit 160 repeats Steps S502 to S505 until all images other than the first image are temporarily set as the second image, the process for temporarily setting the second image is not limited thereto. The first calculation unit 160 may temporarily set an image whose photographing time is closest to the first image from among a plurality of images input from the input unit 130, an image when a given time has elapsed from the photographing time of the first image, or an image whose photographing time is farthest from the first image, as the second image. After Step S90, when the measurement point is reset in Step S40, the second image which is temporarily set by the first calculation unit 160 becomes the second image selected in Step S80. In these cases, Steps S502 to S505 are not repeated.

In the example illustrated in FIG. 6, an image 501 is temporarily set as the second image.

Subsequently, the first calculation unit 160 calculates an epipolar line, which corresponding to the measurement point on the first image, on the second image temporarily set by the first calculation unit 160 (Step S503). Specifically, the first calculation unit 160 calculates the epipolar line using the camera parameters of the first image and the second image. A method of calculating the epipolar line using the camera parameters is well known, thus detailed description thereof will be omitted.

In the example illustrated in FIG. 6, an epipolar line 502 on the image 501 is calculated.

Subsequently, the first calculation unit 160 sets a window region corresponding to the window region of the first image on the epipolar line of the second image, and calculates the correlation value of luminance in both window regions (performs a correlation operation) to calculate a correspondence point (Step S504). That is, the first calculation unit 160 performs a correlation operation of the first image and the second image to calculate the correspondence point.

In the example illustrated in FIG. 6, a window region 503 is set on the epipolar line 502 of the image 501.

The first calculation unit 160 calculates the correlation value of luminance (performs the correlation operation) using NCC (Normalized Cross-Correlation) illustrated in Equation (1).

$$NCC(x, y) = \frac{\sum_k \sum_j I_{501}(x+k, y+j) I_{400}(k, j)}{\sqrt{\sum_k \sum_j I_{501}(x+k, y+j)^2 \times \sum_k \sum_j I_{400}(k, j)^2}} \quad (1)$$

In Equation (1), the value of NCC of the position (x, y) on the image 501 as the second image is calculated. $I_{400}$ and $I_{501}$ respectively represent luminance of the image 400 (first image) and the image 501 (second image) illustrated in FIG. 6. k and j represent the pixel position in the window region 500 illustrated in FIG. 6, and x+k and y+j represent the pixel position in the window region 503.

The correlation operation method of the first calculation unit 160 is not limited to NCC, and SAD (Sum of Absolute Difference), SSD (Sum of Squared Difference), ZNCC (Zero-mean Normalized Cross-Correlation), or the like may be used.

The first calculation unit 160 calculates the correlation value while moving the position (x, y) on the image 501 on the epipolar line 502. The first calculation unit 160 stores (saves) the position (x, y) on the image 501 where the correlation value is calculated, the calculated correlation value, and the image 501 temporarily set in the second image, in a storage unit (not illustrated). The storage unit can be implemented by, for example, at least one of magnetically, optically, and electrically storable storage devices, such as an HDD, an SSD, a RAM (Random Access Memory), and a memory card.

Although x and y have a linear relation by the epipolar line 502, the first calculation unit 160 may perform a correlation operation for a position (for example, ±N (where N is a natural number) pixels of the epipolar line 502) adjacent to the epipolar line 502 taking into consideration estimation error of the epipolar line 502 or the like, instead of performing the correlation operation on the epipolar line 502. In order to increase the accuracy of the position (x, y) on the image 501, the first calculation unit 160 may performs subpixel estimation by applying a quadratic curve or a conformal linear shape to the correlation value.

Subsequently, if all images other than the first image are not temporarily set as the second image (No in Step S505), the process returns to Step S502, and all images other than the first image are temporarily set as the second image. If all images other than the first image are temporarily set (Yes in Step S505), the process progresses to Step S506.

Subsequently, the first calculation unit 160 compares the correlation values stored in Step S504, and searches for the second image which has the most correlation (highest correlation) with the first image and the position (x, y) on the second image (Step S506). When NCC or ZNCC is used, the larger the correction value, the higher the correlation. When SAD or SSD is used, the smaller the correlation value, the higher the correlation.

Alternatively, the first calculation unit 160 may search for the second image whose correlation value stored in Step S504 satisfies a threshold value TC (an example of a second threshold value) and the position (x, y) on the second image. Still alternatively, after Step S90, when the measurement point is reset in Step S40, in Step S504, the first calculation unit 160 may calculate measurement error in accordance with error calculated in Step S80, and may search for the second image having the smallest measurement error, instead of the correlation value, and the position (x, y) on the second image.

Subsequently, the first calculation unit 160 determines the second image thus searched for, as the second image, and determines the position (x, y) on the searched second image as the correspondence point (Step S507).

Figure 7:
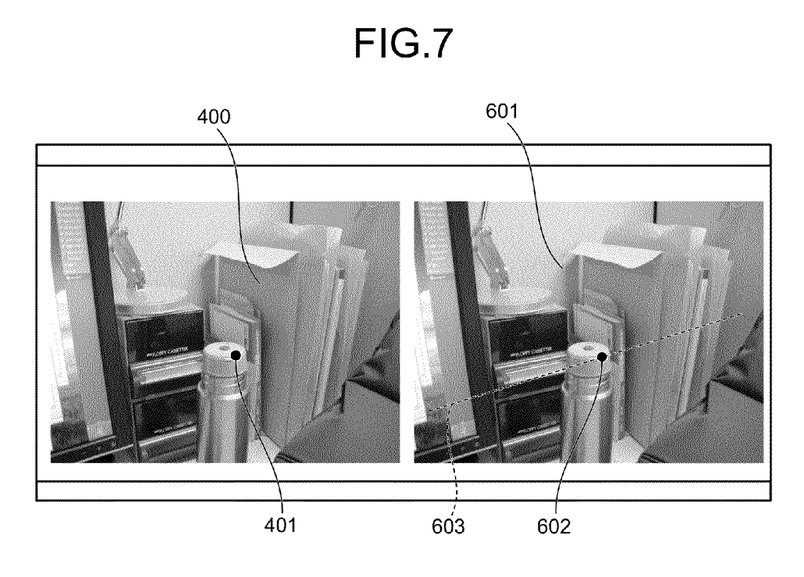
FIG. 7 is a diagram illustrating a display screen example of this embodiment.

Returning to FIG. 2, if the second image and the correspondence point are determined by the first calculation unit 160, the display control unit 120 displays a display screen of the first image and the second image on the display unit 110 (Step S60). FIG. 7 is a diagram illustrating an example of a display screen of this embodiment. In the example illustrated in FIG. 7, the display control unit 120 displays a display screen of the image 400 selected by the first selection unit 140 as the first image and an image 601 selected by the first calculation unit 160 as the second image on the display unit 110. The measurement point 401 is displayed on the image 400 in an overlapping manner, and a correspondence point 602 and an epipolar line 603 are displayed on the image 601 in an overlapping manner.

The operator confirms whether or not the position of the correspondence point 602 corresponding to the measurement point 401 is correct. When the position of the correspondence point 602 is not correct, the setting unit 150 may correct and reset the position of the correspondence point 602 on the image 601 based on a mouse operation or the like from the operator so as to be placed on the epipolar line 603, for example. At this time, the display control unit 120 may display the image 601 (display screen) on an enlarged scale such that the correspondence point is correctable with high accuracy.

Subsequently, the second calculation unit 170 calculates the three-dimensional position of the measurement point using the first image, the measurement point on the first image, the second image, and the correspondence point on the second image, and also calculates an error in the calculated three-dimensional position (Step S70). When passing through Step S90, the second calculation unit 170 calculates the three-dimensional position of the measurement point using a new first image, a first projection point (an example of a first projection position) where the previous three-dimensional position (the previous three-dimensional position calculated in Step S70) is projected onto the new first image, a new second image, and a second projection point (an example of a second projection position) where the previous three-dimensional position is projected onto the new second image. In the following description, the measurement point can be deemed to be replaced with the first projection point, and the correspondence point can be deemed to be replaced with the second projection point.

Specifically, it is assumed that the homogeneous coordinates of the measurement point of the first image are represented by Equation (2), the homogeneous coordinates of the correspondence point of the second image are represented by Equation (3), the projection matrixes of three rows and four columns of the first image and the second image with the camera parameters are P and P', and the homogeneous coordinates of the three-dimensional position to be calculated are represented by Equation (4). In this case, since the three-dimensional position to be calculated is represented by Equations (5) and (6), and a simultaneous equation with three unknowns and four equations is established, the second calculation unit 170 calculates the three-dimensional position represented by Equation (7) using, for example, a least-squares method or the like.

$$\tilde{m}=(u\ v\ 1)^T \qquad (2)$$

$$\tilde{m}'=(u'\ v'\ 1)^T \qquad (3)$$

$$\tilde{X}_w=(X\ Y\ Z\ 1)^T \qquad (4)$$

$$\tilde{m} \sim P\tilde{X}_w \qquad (5)$$

$$\tilde{m}' \sim P'\tilde{X}_w \qquad (6)$$

$$X_w=(X\ Y\ Z) \qquad (7)$$

Next, a method of calculating measurement error in a three-dimensional position will be described.

Figure 8:
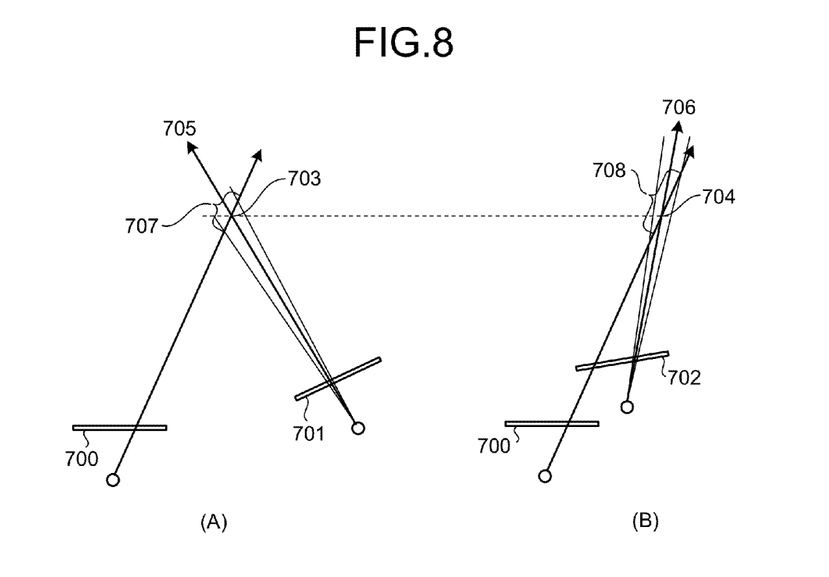
FIG. 8 is an explanatory view illustrating an example of measurement error in a three-dimensional position of this embodiment.

FIG. 8 is an explanatory view illustrating an example of measurement error in the three-dimensional position of this embodiment. In the case (A) illustrated in FIG. 8, a position where a light beam 705 which passes through a three-dimensional position 703 of a measurement point of a first image 700 intersects the image surface of a second image 701 becomes the correspondence point of the second image 701. Since it is difficult to estimate the correspondence point with no error, and actually, an error of correspondence point estimation appears, a light beam may have the form in which error appears on both sides of the light beam 705, and measurement error 707 occurs.

In the case (B) illustrated in FIG. 8, the position where a light beam 706 which passes through a three-dimensional position 704 of the measurement point of the first image 700 intersects the image surface of a second image 702 becomes the correspondence point of the second image 702. In the case (B) of FIG. 8, while the first image 700 is at the same location as the case (A) of FIG. 8, the second image 702 at a location different from the case (A) of FIG. 8. In FIG. 8, it is understood that, if the optical axis passing through the measurement point and the depth position of the measurement point are aligned, measurement error 708 in the case (B) of FIG. 8 is larger than the measurement error 707 in the case (A) of FIG. 8.

The second calculation unit 170 may calculate measurement error taking into consideration error in the second image, or may calculate measurement error taking into consideration error in both the first image and the second image. Error in the first image is error which occurs when the measurement point is set in the first image.

When calculating measurement error taking into consideration error in the second image, the second calculation unit 170 represents the homogeneous coordinates of the correspondence point of the second image by Equations (8) and (9), instead of Equation (3), and applies to Equations (5) and (6) to calculate the three-dimensional position represented by Equations (10) and (11).

$$\tilde{m}''=(u'+s\ v'\ 1)^T \qquad (8)$$

$$\tilde{m}'''=(u'-s\ v'\ 1)^T \qquad (9)$$

$$\tilde{X}''_w \qquad (10)$$

$$\tilde{X}'''_w \qquad (11)$$

In regard to the homogeneous coordinates of the correspondence point of the second image represented by Equations (8) and (9), when the epipolar line is horizontal to the image, subpixel estimation processing is performed, and the correspondence point is calculated in terms of pixel positions which can be calculated through subpixel estimation (for example, about ¼ of one pixel) or in terms of pixels, pixels with a ½ sampling interval are set as a position where error appears, and these pixels are s pixels.

The second calculation unit 170 calculates measurement error in the three-dimensional position using Equation (12).

$$\text{err}=\max(|X_w-X''_w|,\ |X''_w-X'''_w|,\ |X_w-X'''_w|) \qquad (12)$$

Here, max(A, B, C) is a function which returns the maximum value among A, B, and C, and |D| denotes the norm.

Figure 9:
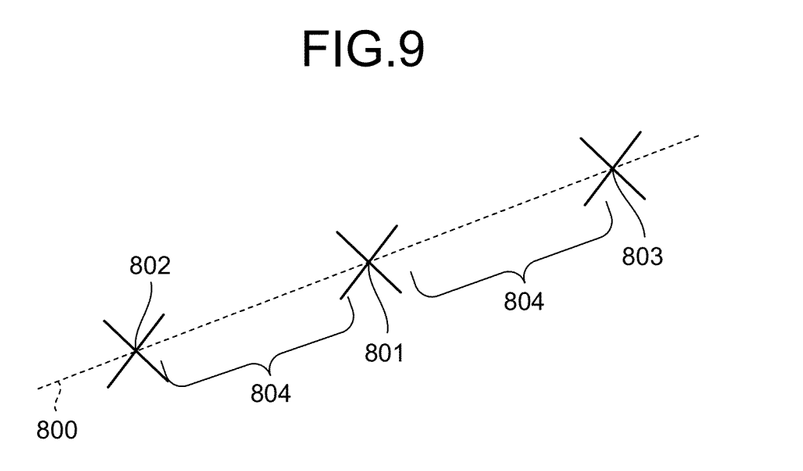
FIG. 9 is an explanatory view illustrating a calculation method example of measurement error in a three-dimensional position of this embodiment.

When the epipolar line is not horizontal to the image, as illustrated in FIG. 9, the second calculation unit 170 may set points 802 and 803 in view of error 804 on both sides of a correspondence point 801 in accordance with the direction of an epipolar line 800, and the magnitude of error 804 may be s pixels along the epipolar line 800.

Figure 10:
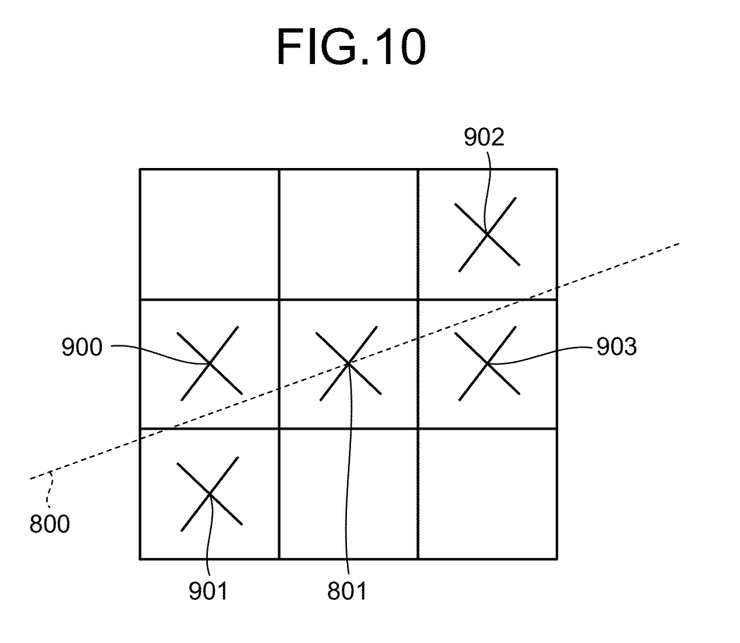
FIG. 10 is an explanatory view illustrating a calculation method example of measurement error in a three-dimensional position of this embodiment.

As illustrated in FIG. 10, the second calculation unit 170 may set points 900 to 903 at respective pixels passing through the epipolar line 800, may calculate the three-dimensional positions from the set points 900 to 903, and may determine the three-dimensional position, in which the norm is maximum, as measurement error in the three-dimensional position as in Equation (12).

Although in Equation (12), the maximum value of the norm is calculated, the average, the variance, or the minimum value may be calculated.

Figure 11:
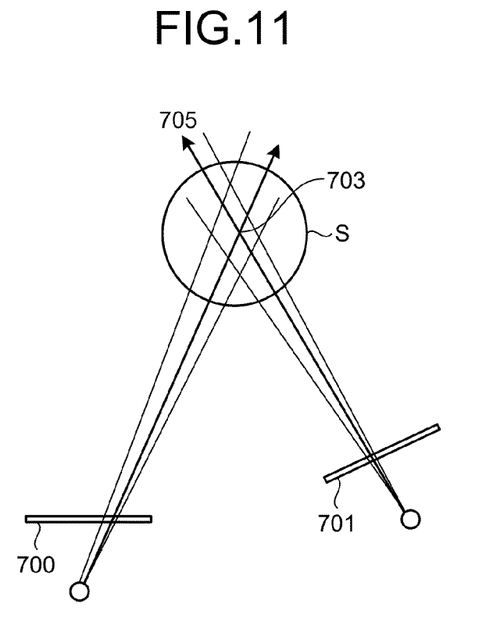
FIG. 11 is an explanatory view illustrating a calculation method example of measurement error in a three-dimensional position of this embodiment.
Figure 12:
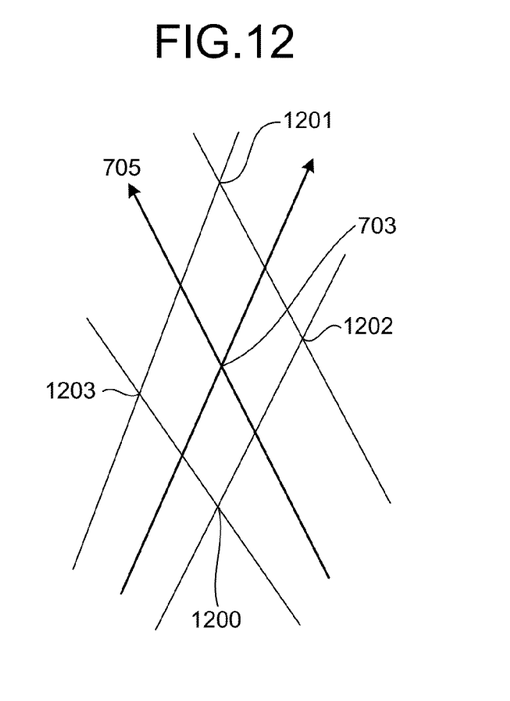
FIG. 12 is an explanatory view illustrating a calculation method example of measurement error in a three-dimensional position of this embodiment.

When calculating measurement error taking into consideration errors in both the first image and the second image, as illustrated in FIGS. 11 and 12, the second calculation unit 170 may take into consideration errors around the measurement point of the first image 700, may calculate three-dimensional positions 1200 to 1203 which are the intersection points of light beams reflecting error in the measurement point and light beams reflecting error in the correspondence point of the second image 701, and may determine the maximum value of the norm of the difference from the three-dimensional position 703 as measurement error in the three-dimensional position. FIG. 12 is an enlarged view of a portion surrounded by a circle S of FIG. 11. The second calculation unit 170 may calculate the average, the variance, or the minimum value, instead of the maximum value of the norm of the difference from the three-dimensional position 703.

Figure 13:
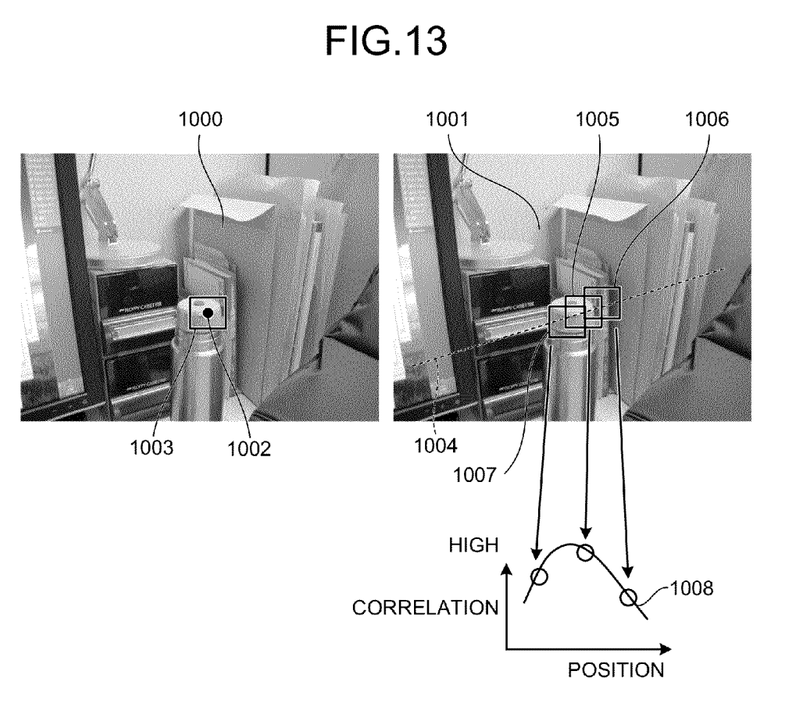
FIG. 13 is an explanatory view illustrating a calculation method example of measurement error in a three-dimensional position of this embodiment.

As illustrated in FIG. 13, the second calculation unit 170 may apply a quadratic function 1008 to the correlation value of an image pattern of a window region 1003 surrounding a measurement point 1002 of an image 1000 as the first image and an image pattern of a window region 1005 surrounding a correspondence point of an image 1001 as the second image, or the correlation value of the image pattern of the window region 1003 and image patterns of window regions 1006 and 1007 surrounding a point where error occurs, thereby calculating a quadratic coefficient.

The quadratic coefficient represents smoothness of the correlation value. The larger the value, the steeper the quadratic function, and estimation may be performed with little error.

The correlation value is smoothened when the window region includes only a pattern which is hard to take a countermeasure, when the image is noisy, when the image is blurred, or when the brightness of the image is not appropriate, or the like. The second calculation unit 170 may apply an equiangular line instead of a quadratic curve, and may handle the slope of the equiangular line as smoothness of the correlation value.

Returning to FIG. 2, the second selection unit 180 (an example of a selection unit) determines whether or not there is an image pair, in which error in the three-dimensional position is smaller than the error calculated by the second calculation unit 170, from among image pairs (an example of a set of images) of a plurality of images input through the input unit 130 using the three-dimensional position and the measurement error calculated by the second calculation unit 170. When there is the image pair, the second selection unit 180 selects the image pair, and when there is no image pair, the second selection unit 180 decides on the three-dimensional position (Step S80).

Figure 14:
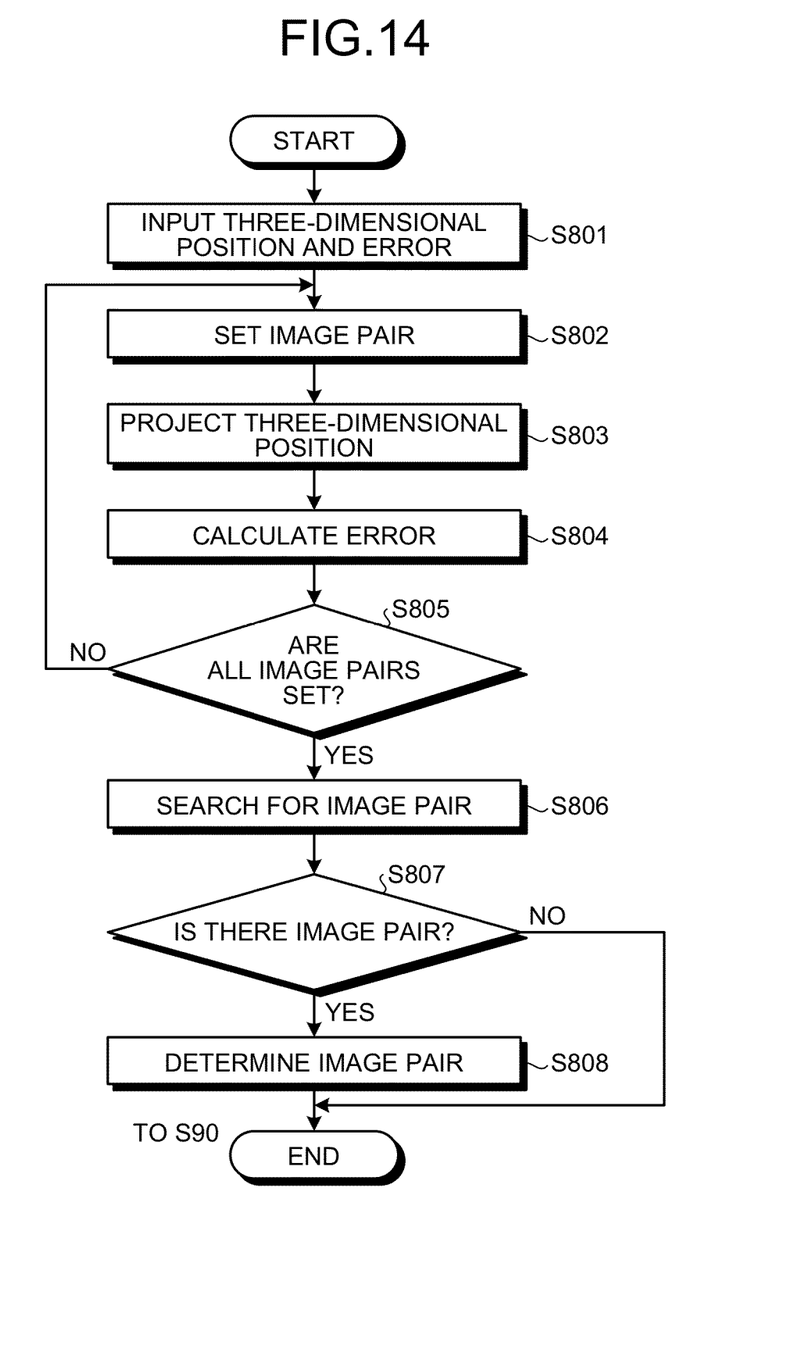
FIG. 14 is a flowchart illustrating an image pair search process example of this embodiment.

FIG. 14 is a flowchart illustrating an example of the flow of a procedure of image pair search process which is performed by the second selection unit 180 of this embodiment.

First, the three-dimensional position and the measurement error calculated by the second calculation unit 170 are input to the second selection unit 180 (Step S801).

Subsequently, the second selection unit 180 sets an image pair from among a plurality of images input through the input unit 130 (Step S802). The second selection unit 180 sets an image pair other than the image pair of the first image and the second image used when the second calculation unit 170 calculates the three-dimensional position and the measurement error, so as not to overlap each other.

Subsequently, the second selection unit 180 projects the three-dimensional position calculated by the second calculation unit 170 onto each image of the selected image pair (Step S803). Specifically, if the homogeneous coordinates of the three-dimensional position are represented by Equation (4), and the projection matrixes P and P' of the respective images of the selected image pair are used, the second selection unit 180 can calculate the projection position on each image of the selected image pair by Equations (5) and (6).

Subsequently, the second selection unit 180 calculates error in the selected image pair (Step S804). In regard to the calculation of error, the method described in connection with the second calculation unit 170 can be used. For example, when calculating measurement error taking into consideration error in any image of the selected image pair, the second selection unit 180 first calculates error with one image of the image pair as the first image and the other image as the second image, and subsequently calculates error after the first image and the second image are reversed. The second selection unit 180 determines the maximum value, the minimum value, or the average value of the calculated errors as measurement error in the image pair.

Although in this embodiment, it is assumed that error is measurement error by position estimation, actually, image quality affects the error. For this reason, the second selection unit 180 calculates a quadratic coefficient representing smoothness of the correlation value for the selected image pair by the same method as in the second calculation unit 170. When the calculated quadratic coefficient is smaller than a threshold value TD (an example of a first threshold value) (that is, in the case of a smoother change), the second selection unit 180 is less likely to estimate the three-dimensional position with higher accuracy than the image pair of the first image and the second image used when the second calculation unit 170 calculates the three-dimensional position and the measurement error. For this reason, it is expected that measurement error increases, and a penalty value is given to the measurement error. For example, the second selection unit 180 multiplies the measurement error by α (where α is positive).

Subsequently, if all image pairs are not set (No in Step S805), the process returns to Step S802, and all image pairs are set. If the setting of the image pairs ends (Yes in Step S805), the process progresses to Step S806. For example, when a plurality of images input through the input unit 130 are an image A, an image B, and an image C, and an image pair used when the second calculation unit 170 calculates the three-dimensional position and measurement error is a pair of the images A and B, if the second selection unit 180 sets an image pair of the images A and C and an image pair of the images B and C, the setting of the image pairs ends.

Subsequently, the second selection unit 180 searches for an image pair, in which measurement error is smaller than measurement error calculated by the second calculation unit 170, from the set image pairs (Step S806).

When an image pair is searched for (Yes in Step S807), the second selection unit 180 determines the image pair thus searched for as an image pair of new first image and second image (Step S808). Specifically, if an image pair is searched for, the second selection unit 180 creates a list in which the pair thus searched for and the positions where the images of the image pair are photographed are described in an increasing order of measurement error. The second selection unit 180 determines an image pair having the highest order (with the smallest measurement error in the list), an image pair having the lowest order (with the largest measurement error in the list), an image pair in which measurement error is smaller than measurement error calculated by the second calculation unit 170 by a set value TH, or an image pair whose photographing position is close to the first image or the second image used when the second calculation unit 170 calculates measurement error, in the created list as an image pair of new first image and second image.

The second selection unit 180 sets one image in the determined image pair as the first image, and sets the other image as the second image. Meanwhile, when the determined image pair includes the first image used when the second calculation unit 170 calculates measurement error, the second selection unit 180 sets the first image as the first image as it is, and sets the other image as the second image as it is. On the other hand, when the determined image pair does not include the first image used when the second calculation unit 170 calculates measurement error, the second selection unit 180 sets, as the first image, an image which is spatially close to the first image, an image whose photographing time is close to the first image, or an image whose focal distance is close to the first image, and sets the other image as the second image. An image which is spatially close to the first image can be calculated by the translation vector of the external parameters.

When an image pair is not searched for (No in Step S807), that is, when measurement error in the image pair of the first image and the second image used when the second calculation unit 170 calculates measurement error from among the set image pairs is minimal, the process ends.

If an image pair of new first image and second image is determined by the second selection unit 180 (Yes in Step S80), the conversion unit 190 performs image conversion, such as rotation in an image, such that the new first image and the first image used when the second calculation unit 170 calculates the measurement error have similar appearance (Step S90). For example, the conversion unit 190 performs image conversion to align the rotation direction of the original first image with the rotation direction of the new first image.

Figure 15:
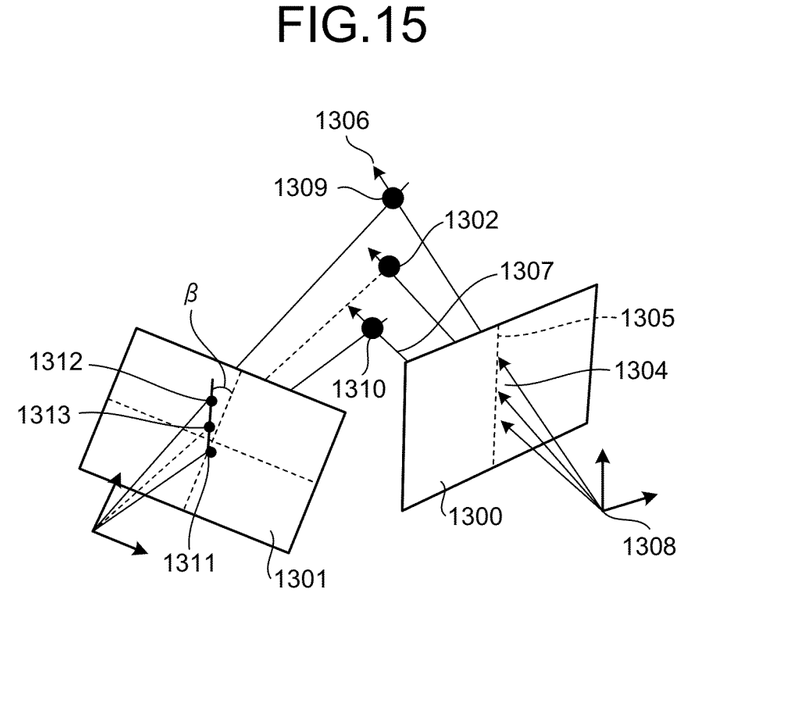
FIG. 15 is an explanatory view of an image conversion method example of this embodiment.

FIG. 15 is an explanatory view of an example of an image conversion method of this embodiment. As illustrated in FIG. 15, the conversion unit 190 sets two light beams 1306 and 1307 on a vertical line 1305 of an image passing through an intersection point 1304 of a three-dimensional position 1302 of the measurement point of a current first image 1300 and the current first image 1300. Next, the conversion unit 190 respectively sets the positions of the light beams 1306 and 1307 with the same distance between the three-dimensional position 1302 and an optical center 1308 of the current first image 1300 as points 1309 and 1310. Next, the conversion unit 190 projects the three-dimensional position 1302 and the points 1309 and 1310 onto a new first image 1301 to respectively set projection points 1313, 1312, and 1311, and calculates a slope β of a line connecting the projection points 1313, 1312, and 1311 and the vertical axis of the new first image 1301. Next, the conversion unit 190 performs image rotation conversion around the projection point 1313 using the calculated slope β.

The conversion unit 190 stores (saves) a conversion rule from an original image to an image after conversion in the storage unit. Accordingly, the second calculation unit 170 returns the coordinates on the image after conversion to the coordinates before conversion once, and calculates the three-dimensional position and measurement error. Since image conversion by the conversion unit 190 is intended for improvement in visibility when the operator confirms the measurement point, image conversion is not necessarily performed and may be performed as necessary.

Thereafter, the process returns to Step S30, the display control unit 120 displays, on the display unit 110, the display screen of the new first image onto which the three-dimensional position is projected and on which image conversion is performed by the conversion unit 190 and the new second image which is selected by the second selection unit 180 and onto which the three-dimensional position is projected.

The conversion unit 190 may perform image conversion on the second image, as well as the first image. The conversion unit 190 may perform image conversion using a method disclosed in "A. Fussiello et al., A Compact Algorithm for rectification of stereo paris, Machine Vision and Applications, 2000."

If the image pair of the new first image and second image is not determined by the second selection unit 180 (No in Step S80), and the three-dimensional position is decided, the display control unit 120 displays the three-dimensional position and error in the three-dimensional position on the display unit 110 (Step S100). The decided three-dimensional position and error in the three-dimensional position may be output in the form of files or the like.

As described above, according to the embodiment, the image pairs are sequentially selected in a decreasing order of measurement error, and the three-dimensional position by an image pair with the smallest measurement error is calculated, thereby increasing the measurement accuracy of the three-dimensional position. In particular, according to the embodiment, since the way to select the first image to be initially selected does not affect the estimation accuracy of the final three-dimensional position, even the operators with different levels of proficiency can perform high-quality three-dimensional measurement without causing individual variation.

Modification

Although in the above-described embodiment, it is assumed that the single second image is used, a plurality of second images may be used. In this case, the first calculation unit 160 may calculate the correlation value using a reciprocal of the depth as disclosed in "M. Okutomi and T. Kanade, "A Multiple-Baseline Stereo," IEEE Transactions on Pattern Analysis and Machine Intelligence, Vol. 15, No. 4, pp. 353-363, April 1993," and may calculate the correspondence point.

Hardware Configuration

The measurement device 100 of the above-described embodiment and the modification includes a control device, such as a CPU (Central Processing Unit), a storage device, such as a ROM or a RAM, an external storage device, such as an HDD or an SSD, a display device, such as a display, an input device, such as a mouse or a keyboard, and an imaging device, such as a camera, and can be implemented by hardware using a normal computer.

A program which is executed by the measurement device 100 of the above-described embodiment and the modification is incorporated in a ROM or the like and provided.

The program which is executed by the measurement device 100 of the above-described embodiment and the modification may be stored in a computer-readable storage medium, such as a CD-ROM, a CD-R, a memory card, a DVD, or a flexible disk (FD), as files of an installable format or an executable format and provided.

The program which is executed by the measurement device 100 of the above-described embodiment and the modification may be stored on a computer connected to a network, such as Internet, downloaded through the network, and provided. The program which is executed by the measurement device 100 of the above-described embodiment and the modification may be provided or distributed through a network, such as Internet.

The program which is executed by the measurement device 100 of the above-described embodiment and the modification has a module configuration for realizing the respective units on the computer. As actual hardware, for example, the control device reads and executes the program from the external storage device on the storage device, thereby implementing the respective units on the computer.

For example, the respective steps in the flowchart of the embodiment may be performed in a different order, a plurality of steps may be performed at the same time, or the order of performing the respective steps may be changed every time the processing in the flowchart is performed, without departing from the features of the respective steps.

As described above, according to the foregoing embodiments and modifications, it is possible to increase the measurement accuracy of the three-dimensional position.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirits of the inventions.

What is claimed is:
1. A measurement device comprising:
 a processor for executing computer-executable components, the computer-executable components including:
 a display controller configured to display a first image from among a plurality of images captured from different viewpoints on a display unit;

a setting unit configured to set a measurement position on the first image;

a first calculator configured to calculate a correspondence position, which corresponds to the measurement position, on a second image other than the first image from among the plurality of images;

a second calculator configured to calculate a three-dimensional position of the measurement position and an error in the three-dimensional position using the first image, the measurement position, the second image, and the correspondence position; and a selection unit configured to determine, each time the three-dimensional position and the error are calculated by the second calculation unit, whether or not there is an image pair, in which an error in the three-dimensional position becomes smaller than the error calculated by the second calculator, from among image pairs of the plurality of images, and further configured to, when there is the image pair, select the image pair, but when there is no image pair, decide on the three-dimensional position, wherein, each time the image pair is selected by the selection unit, the second calculator calculates a new three-dimensional position of the measurement position and an error using a new first image included in the image pair, a first projection position where the three-dimensional position is projected onto the new first image, a new second image included in the image pair, and a second projection position where the three-dimensional position is projected onto the new second image.

2. The device according to claim 1,
wherein the selection unit sets a projection position by projecting the three-dimensional position onto each image included in the image pair using a projection matrix representing transformation from a three-dimensional coordinate system to an image coordinate system, and calculates the error in the three-dimensional position in the image pair based on each projection position.

3. The device according to claim 2,
wherein the selection unit performs a correlation operation around each projection position, and when a value representing smoothness of a correlation value does not satisfy a first threshold value, gives a penalty value to the error in the three-dimensional position in the image pair.

4. The device according to claim 1,
wherein, when there are a plurality of image pairs in which the error in the three-dimensional position becomes smaller than the error calculated by the second calculator, the selection unit selects an image pair with the smallest error in the three-dimensional position.

5. The device according to claim 1,
wherein, when the first image is included in the selected image pair, the selection unit sets the first image as the new first image, and sets another image as the new second image.

6. The device according to claim 1,
wherein the first calculator performs a correlation operation of the first image and the second image to calculate the correspondence position, and the second image is an image which has the highest correlation with the first image, an image in which the correlation with the first image satisfies a second threshold value, an image whose photographing time is closest to the first image, or an image whose photographing time is farthest from the first image, from among the plurality of images.

7. The device according to claim 1,
wherein the display controller displays the second image, in which the correspondence position is set, on the display unit, and the setting unit corrects and resets the correspondence position.

8. The device according to claim 1, further comprising:
a converter configured to perform image conversion to align a rotation direction of the new first image with a rotation direction of the first image, wherein the display controller displays the new first image, in which the first projection position is set and the image conversion is performed, and the new second image, in which the second projection position is set, on the display unit, and the setting unit corrects and resets at least one of the first projection position and the second projection position.

9. A measurement method comprising:
displaying, by a display controller, a first image from among a plurality of images captured with different viewpoints on a display unit;

setting, by a setting unit, a measurement position on the first image;

calculating, by a first calculator, a correspondence position, which corresponds to the measurement position, on a second image other than the first image from among the plurality of images;

calculating, by a second calculator, a three-dimensional position of the measurement position and an error in the three-dimensional position using the first image, the measurement position, the second image, and the correspondence position;

determining, by a selection unit, each time the three-dimensional position and the error are calculated by the second calculator, whether or not there is an image pair, in which an error in the three-dimensional position becomes smaller than the error calculated by the second calculator, from among image pairs of the plurality of images; and selecting, when there is an image pair, the image pair, but deciding on, when there is no image pair, the three-dimensional position, wherein, in the calculating the three-dimensional position and the error in the three-dimensional position, each time the image pair is selected by the selection unit, a new three-dimensional position of the measurement position and an error are calculated using a new first image included in the image pair, a first projection position where the three-dimensional position is projected onto the new first image, a new second image included in the image pair, and a second projection position where the three-dimensional position is projected onto the new second image.

10. A computer program product comprising a non-transitory computer-readable medium containing a measurement program that, when executed, causes a computer to at least:
display a first image from among a plurality of images captured with different viewpoints on a display unit;

set a measurement position on the first image;

calculate a correspondence position, which corresponds to the measurement position, on a second image other than the first image from among the plurality of images;

calculate a three-dimensional position of the measurement position and an error in the three-dimensional position using the first image, the measurement position, the second image, and the correspondence position;

determine, each time the three-dimensional position and the error are calculated, whether or not there is an image pair, in which an error in the three-dimensional position becomes smaller than the error calculated in the calculating the three-dimensional position and the error in the three-dimensional position, from among image pairs of the plurality of images; and select, when there is an image pair, the image pair, but deciding on, when there is no image pair, the three-dimensional position, wherein, in the calculating the three-dimensional position and the error in the three-dimensional position, each time the image pair is selected in the selecting, a new three-dimensional position of the measurement position and an error are calculated using a new first image included in the image pair, a first projection position where the three-dimensional position is projected onto the new first image, a new second image included in the image pair, and a second projection position where the three-dimensional position is projected onto the new second image.

* * * * *